(12) United States Patent
Mann

(10) Patent No.: US 12,615,698 B2
(45) Date of Patent: Apr. 28, 2026

(54) HEATING ELEMENT

(71) Applicant: Kanthal GmbH, Mörfelden-Walldorf (DE)

(72) Inventor: Markus Mann, Mörfelden-Walldorf (DE)

(73) Assignee: Kanthal GmbH, Mörfelden-Walldorf (DE)

( * ) Notice: Subject to any disclaimer, the term of this patent is extended or adjusted under 35 U.S.C. 154(b) by 704 days.

(21) Appl. No.: 17/911,521

(22) PCT Filed: Mar. 22, 2021

(86) PCT No.: PCT/EP2021/057286
§ 371 (c)(1),
(2) Date: Sep. 14, 2022

(87) PCT Pub. No.: WO2021/191155
PCT Pub. Date: Sep. 30, 2021

(65) Prior Publication Data
US 2023/0363060 A1     Nov. 9, 2023

(30) Foreign Application Priority Data
Mar. 23, 2020   (EP) ..................................... 20164996

(51) Int. Cl.
*H05B 3/42*          (2006.01)
*H05B 3/12*          (2006.01)
*B33Y 80/00*         (2015.01)

(52) U.S. Cl.
CPC ................ *H05B 3/42* (2013.01); *H05B 3/12* (2013.01); *B33Y 80/00* (2014.12); *H05B 2203/017* (2013.01); *H05B 2203/024* (2013.01)

(58) Field of Classification Search
None
See application file for complete search history.

(56) References Cited

U.S. PATENT DOCUMENTS

| | | | | | |
|---|---|---|---|---|---|
| 1,001,654 | A | * | 8/1911 | Kratt ..................... | F24H 3/0405 392/494 |
| 2,875,312 | A | * | 2/1959 | Norton ..................... | H05B 3/48 29/521 |

(Continued)

FOREIGN PATENT DOCUMENTS

| | | |
|---|---|---|
| DE | 10012675 A1 | 9/2001 |
| EP | 2784049 A2 | 10/2014 |

(Continued)

OTHER PUBLICATIONS

International Search Report and Written Opinion dated Jun. 18, 2021, issued in corresponding International Patent Application No. PCT/EP2021/057286.

(Continued)

*Primary Examiner* — Thor S Campbell
(74) *Attorney, Agent, or Firm* — Morgan, Lewis & Bockius LLP

(57) ABSTRACT

A heating element and heating assembly to heat a fluid as part of a heating device. The heating element is formed from a high electrical resistance material such as an FeCrAl based material. The heating device comprises a heating block having a high heating-surface area to volume ratio (HTVR) to achieve a high heating density with a low surface load.

12 Claims, 6 Drawing Sheets

(56) References Cited

U.S. PATENT DOCUMENTS

| | | | | |
|---|---|---|---|---|
| 3,693,711 | A * | 9/1972 | Zygiel | B21C 37/151 |
| | | | | 165/DIG. 397 |
| 3,782,456 | A * | 1/1974 | Gusmer | F28F 7/02 |
| | | | | 165/83 |
| 3,825,460 | A * | 7/1974 | Yoshikawa et al. | C04B 35/83 |
| | | | | 428/116 |
| 3,995,143 | A * | 11/1976 | Hervert | H05B 3/146 |
| | | | | 219/205 |
| 4,107,515 | A * | 8/1978 | Kulwicki | F02M 31/135 |
| | | | | 219/541 |
| 4,179,603 | A * | 12/1979 | Zeigler | H05B 3/64 |
| | | | | 338/237 |
| 4,343,988 | A * | 8/1982 | Roller | A47J 31/545 |
| | | | | 392/467 |
| 4,417,116 | A * | 11/1983 | Black | H05B 6/804 |
| | | | | 219/688 |
| RE33,013 | E * | 8/1989 | Takeuchi | B01J 15/00 |
| | | | | 428/116 |
| 5,134,684 | A * | 7/1992 | Mishou | H05B 3/44 |
| | | | | 392/379 |
| 5,140,812 | A * | 8/1992 | Cornelison | F01N 3/2853 |
| | | | | 422/174 |
| 5,446,264 | A | 8/1995 | Kondo et al. | |
| 5,463,206 | A | 10/1995 | Abe et al. | |
| 5,543,603 | A * | 8/1996 | Schmadig | F27D 1/0036 |
| | | | | 219/536 |
| 5,598,502 | A * | 1/1997 | Takahashi | H05B 3/14 |
| | | | | 219/505 |
| 5,694,515 | A * | 12/1997 | Goswami | F28D 20/0056 |
| | | | | 137/341 |
| 5,724,478 | A * | 3/1998 | Thweatt | F24H 1/142 |
| | | | | 219/535 |
| 5,764,850 | A * | 6/1998 | Olstad | F23D 14/66 |
| | | | | 219/544 |
| 5,949,958 | A * | 9/1999 | Naperkowski | F22B 1/288 |
| | | | | 392/399 |
| 6,097,011 | A * | 8/2000 | Gadkaree | B01J 20/28042 |
| | | | | 428/116 |
| 6,166,358 | A | 12/2000 | Abe | |
| 6,330,395 | B1 * | 12/2001 | Wu | H05B 3/283 |
| | | | | 392/494 |
| 6,873,790 | B1 * | 3/2005 | Cooper | F24H 3/0405 |
| | | | | 392/360 |
| 6,944,394 | B2 * | 9/2005 | Long | F24H 1/102 |
| | | | | 392/480 |
| 7,046,922 | B1 * | 5/2006 | Sturm | F24H 15/219 |
| | | | | 392/482 |
| 7,190,893 | B2 * | 3/2007 | Kuebler | F24H 1/121 |
| | | | | 392/494 |
| 7,679,034 | B2 | 3/2010 | Goto et al. | |
| 7,822,326 | B2 * | 10/2010 | Commette | F24H 1/102 |
| | | | | 392/484 |
| 8,907,256 | B2 * | 12/2014 | Hashimoto | F01M 5/00 |
| | | | | 219/553 |
| 8,940,072 | B2 * | 1/2015 | Boulet | B01J 20/3007 |
| | | | | 55/524 |
| 9,289,754 | B2 | 3/2016 | Kikuchi et al. | |
| 9,383,119 | B2 * | 7/2016 | Kida | F24H 9/02 |
| 9,867,232 | B2 * | 1/2018 | Mann | H05B 3/48 |
| 10,921,021 | B2 * | 2/2021 | Schmider | A61M 5/44 |
| 11,002,465 | B2 * | 5/2021 | Liu | H05B 3/04 |
| 11,692,738 | B2 * | 7/2023 | Gotoh | H05B 3/42 |
| | | | | 392/373 |
| 11,859,866 | B2 * | 1/2024 | Michelon | F24H 1/142 |
| 11,933,520 | B2 * | 3/2024 | Ogasawara | B60H 1/004 |
| 11,986,804 | B2 * | 5/2024 | Mortensen | B01J 37/14 |
| 12,000,622 | B2 * | 6/2024 | Schatz | H05B 3/42 |
| 12,281,819 | B2 * | 4/2025 | Mann | F28F 7/02 |
| 12,313,294 | B2 * | 5/2025 | Liu | F24H 9/0015 |
| 2007/0041862 | A1 | 2/2007 | Hattendorf et al. | |
| 2007/0189741 | A1 | 8/2007 | Gruetzmann et al. | |
| 2009/0148802 | A1 | 6/2009 | Ihle et al. | |
| 2013/0287378 | A1 * | 10/2013 | Kida | H05B 3/141 |
| | | | | 392/465 |
| 2023/0030980 | A1 * | 2/2023 | Beall | H05B 3/12 |

FOREIGN PATENT DOCUMENTS

| | | | |
|---|---|---|---|
| JP | H04-280087 | A | 10/1992 |
| JP | H05-144549 | A | 6/1993 |
| JP | H11-93649 | A | 4/1999 |
| JP | 2006-302887 | A | 11/2006 |
| JP | 2007-534845 | A | 11/2007 |
| JP | 2009-082873 | A | 4/2009 |
| JP | 2011-507153 | A | 3/2011 |
| JP | 2014-198652 | A | 10/2014 |
| JP | 2020-504596 | A | 2/2020 |
| KR | 10-2014-0019683 | A | 2/2014 |
| WO | 2009/071590 | A1 | 6/2009 |
| WO | 2019/228795 | A1 | 12/2019 |

OTHER PUBLICATIONS

Office Action dated Jan. 28, 2025, issued in corresponding Japanese Patent Application No. 2022-556537.

Office Action dated Jul. 1, 2025, issued in corresponding Japanese Patent Application No. 2022-556537.

Office Action dated Dec. 16, 2025, issued in corresponding Japanese Patent Application No. 2022-556537.

* cited by examiner

A-A

26

25 41 38

26

28 30 31 32

29 25

HEATING ELEMENT

FIELD OF DISCLOSURE

The present disclosure relates to an electric heater to heat a flow of a fluid and in particular, although not exclusively, to a heating element mountable within an electric heater formed from a high resistance electrically conducting material.

BACKGROUND

Electric heaters for heating gases to high temperatures typically include a ceramic block or jacket with lengthwise extending bores through which extend a relatively thin heating wire to heat the gas as it flows through the block. The effectiveness and efficiency of the conversion of the electrical energy into heat (via the heating wire) depends on, for example, the available electrical voltage applied, the electrical resistance of the wire, a maximum operating temperature achievable by the wire, the fluid flow resistance and the external surface area of the heating element that is in contact with the flowing fluid. Typically, maximum gas temperatures that can be achieved by conventional electric process heaters may be of the order of around 700° C. to 900° C.

A different kind of electric heater comprises one or more heated channel forming elements for heating a fluid. WO 2009/071590, US 2007/189741, EP 2784049, US 2013/287378, and DE 10012675, disclose various such heating systems comprising ceramic electric resistance heating elements forming one or more channels, through which a fluid to be heated flows.

US 2007/189741 and EP 2784049 each discloses heating elements comprising a number of channels arranged for parallel flow of the fluid to be heated therethrough. The electric current for heating the heating elements is applied in parallel over the channels.

SUMMARY OF THE DISCLOSURE

It is one objective of the present disclosure to provide a heating element, a heating assembly and/or an electric heater configured for enhanced thermal energy transfer between the device and the fluid by means of having a high heating surface area per volume. It is a further specific objective to provide a heating element arrangement with enhanced structural and mechanical properties and in particular having flexural strength so as to withstand vibrations and movements relative to other components of the heating assembly/device and which heating arrangement can operate in any orientation. It is a further specific objective to provide a heating element and an electric heater that is not susceptible to 'shorting' due to undesirable movement of the electrically conducting heating element and contact with itself or other electrically conducting components within the heating device.

The objectives are achieved via a heating element and electrical heating device in which the heating block is formed from an electrically conducting material so as to obviate the need for a further heating wire extending within the fluid flow bores of the heating block (according to existing arrangements). Accordingly, a heating block formed from an electrically conducting material represents a stable structure and is adapted via internal bores or channels for the through-flow and direct/active heating of the fluid. The internal hollow material structure is accordingly resistant to stresses and the general physical demands encountered in use resultant from large pressure differential, gravitational forces and cyclical heating gradients. In particular, the present arrangement provides a high strength heating assembly to obviate the need for an additional wire-type heating element and ceramic channel-like structures. As such, the present arrangement will be both more compact and lightweight than conventional arrangements and is characterized by a high heating surface area per volume compared to conventional heating devices.

The present heating assembly is adapted to be an active heating assembly via the electrically conducting material that forms/defines the heating block that in turn defines a) the pathway through which the current flows exclusively, predominantly or preferentially relative to any other conducting bodies within the electric heater and b) fulfils the function of defining the structure through which a fluid flows. However, the present heating block may be operative with additional structural element bodies such as ceramic components, sheaths, stabilising rods or spacers, with such additional components providing secondary and passive heating components relative to the present heating element with such secondary components being non-electrically conducting that allow for extended operation conditions.

The term "block" as used herein in the context of the heating block is not limited to a particular cross-sectional geometric shape but may also relate to any relevant structural shape, if no further definition of the structure of the heating block is provided.

The present heating element is further advantageous to enable freedom of design choice with regard to shapes and configuration of the heating block, which may also be called heating structure. For example, the present heating element may be manufactured by using additive manufacturing, such as 3D printing, in which the electrically conducting heating block is formed as unitary body or as an assembly/collection of additive manufacturing printed individual heating elements electrically coupled and mechanically assembled to form the heating block. Advantageously, the heating elements and/or the heating blocks and/or heating structure may be formed by additive manufacturing printing together with integral manufacturing of additional features and components such as the terminals for connection to a current supply, stabilising discs, rods, blocks, braces, brackets, flanges and/or fluid flow directing fins/surface area extensions and fluid flow perturbations to disrupt the fluid flow through the bores or channels. Alternatively, additional features and components such as the terminals for connection to a current supply, stabilising discs, rods, blocks, braces and/or brackets may be manufactured separately and assembled with the heating elements and/or the heating blocks and/or heating structure.

According to a first aspect of the present disclosure there is provided an electric heater to heat a flow of a fluid comprising:

at least one heating element defining an axially elongate heating block having first and second lengthwise ends;

a plurality of longitudinal bores or channels extending internally through the axially elongate heating block and being open at each respective first and second lengthwise end;

the at least one heating element consisting of an electrically conducting material for active resistance or more than one electrically conducting material for active resistance heating; and first and second terminals provided at the heating block for connection to a current supply. The electrically conducting material or the more than one electrically conducting material is/are selected from the group consisting of an iron-chromium-aluminium alloy; a nickel-chromium alloy, a copper-nickel based alloy or iron-nickel-chromium alloy, and an intermetallic material.

Thus, high power density may be achieved in the electric heater and additionally electric resistance heating of the heating element will provide for heating of the heating block up to a temperature of 1 300° Celsius. Accordingly, the flow of fluid through the electric heater may be heated to high temperatures, such as e.g., from ambient temperature (e.g. 20° C.) to within a range of 1 000 to 1 250° C. in a single step. Moreover, the current supply to the heating block may be provided by common line voltages.

The at least one heating element will both guide and heat the flow of fluid when it passes through the electric heater.

According to embodiments, the heating element may be manufactured by using additive manufacturing, in which the electrically conducting heating block is formed as unitary body or as an assembly/collection of additive manufacturing printed individual heating elements electrically coupled and mechanically assembled to form the heating block. In this manner, the heating element/s may be manufactured in an efficient manner. Namely, the materials which may be used is selected from one or more of the group consisting of an iron-chromium-aluminium alloy; a nickel-chromium alloy, a copper-nickel based alloy or iron-nickel-chromium alloy, and an intermetallic material are materials which may be difficult or impossible to shape using an ordinary manufacturing method such as machining. Moreover, complex geometric shapes e.g., inside the channels, may be achieved by using additive manufacturing.

According to one embodiment, a heating-surface area to volume ratio (HTVR) of the heating block as defined hereinabove or hereinafter is defined by the equation (1):

$$\Sigma(A)/V \geq 1 \text{ m}^{-1} \tag{1}$$

wherein $\Sigma(A)$ is the sum of the heating surface areas of at least the bores or channels extending between the first and second lengthwise ends and V is a total enveloping volume of said electrically conducting material wherein the total enveloping volume of said electrically conduction material is the sum of the volume of all bores and channels and of the electrically conducting material.

According to one embodiment, at least 80% of the electric heater as defined hereinabove or hereinafter may also fulfil the condition (2) of:

$$\text{[wetted perimeter or circumference]/[enveloping cross-sectional area]} \geq 1 \text{ m}^{-1} \tag{2}$$

wherein the wetted perimeter or circumference is the total length of all the edges of the heating block which are in direct contact with the fluid flow at a given cross section; and wherein the enveloping cross-sectional area is the sum of the cross-sectional area of the heating block or heating structure and bores or channels at the same lengthwise direction.

According to embodiments, for the heating block as defined hereinabove or hereinafter, the HTVR and/or condition (2) is in a range 1.0 to 4.0 m$^{-1}$, 1.0 to 3.0 m$^{-1}$ or 1.0 to 2.5 m$^{-1}$.

According to the present disclosure, the at least one heating element consists of an electrically conducting material for active resistance heating but the at least one heating element may also consist of more than one electrically conducting material for active resistance heating. The electrically conducting material(s) may has/have a homogeneous composition(s). As mentioned above, the electrically conducting material for active resistance heating is selected from of the group of an iron-chromium-aluminium (FeCrAl) alloy; a nickel-chromium (NiCr) alloy, an iron-nickel-chromium (NiCrFe) alloy, a copper-nickel (CuNi) based alloy and an intermetallic material. The intermetallic material should also generate heat. Hence, the at least one heating element may consist of one of the above-mentioned material or may consist of a combination of the above-mentioned material. Also, the heating structure may comprise heating elements of different material. If additive manufacturing is used as a production method, then the materials mentioned above are provided as powders or wires.

According to embodiments, a heating element surface load may be in the range of 1 to 3 W/cm$^2$ under atmospheric conditions and the outlet temperature of the fluid flow may be within a range of 1 000 to 1 250° C. In this manner, during use of the electric heater, there may be provided a relatively low surface load on the heating block while achieving a high outlet temperature. This may provide for a long operational lifetime in comparison with conventional electric heaters in which a thin high electrical resistance heating wire is utilised.

Optionally, the heater may comprise a plurality of heating elements assembled together as the heating block, each heating element comprising the material and having a bore or channel that in part defines the bores or channels of the heating block. Specifically, each heating element may comprise only one bore or channel extending therethrough.

According to one embodiment, the heater further comprises a plurality of stabilising rods or spacers positioned between and abutting against the heating elements along their respective lengths, the heating elements being spaced apart from one another and in indirect contact via the rods or spacers. According to such arrangements, the heater is advantageous to provide both internal facing and external facing surfaces of the heating block as active heating surfaces in contact with the fluid (such as gas) as it flows between the respective lengthwise ends of the heating block. The heating block may comprise insulation material positioned adjacent an external facing surface. Such insulation material may be provided in direct contact with the external facing surface or may be spaced apart from the external surface such that the external surface is exposed to the flow of fluid flow/gas to be heated to enhance the size (surface area) of the total active heating surface within the device.

Thus, according to embodiments comprising a plurality of heating elements assembled together, the plurality of longitudinal bores or channels extending internally through the axially elongated heating block may include channels formed in gap regions between external facing surfaces between neighbouring heating elements. In this manner, the flow of fluid may not only flow through insides of the plurality of heating elements but also along external surfaces of the heating elements. Thus, a high HTVR may be provided by the heating block.

According to embodiments, the stabilising rods or spacers are dimensioned so as to create the gap regions between the heating elements. In this manner, the gap regions may conveniently be provided while the stabilising rods or spacers simultaneously may provide the stabilising function of the heating elements. For instance, the rods or spacers may abut against only portions of the external facing surfaces of the heating elements.

According to embodiments, at least one of the stabilising rods or spacers may be arranged in abutment with three or four of the heating elements. In this manner, one rod or spacer may support three or four heating elements, while also at least contributing to providing gap regions between the three or four heating elements. For instance, if each heating element has a substantially square cross section, a rod or spacer may be arranged in abutment with the four corner portions of each of four neighbouring heating elements. A corresponding position of a rod or spacer in relation to four heating elements may be provided for heating elements having a round cross section. Alternatively, a rod or spacer may abut against three heating elements having a round cross section.

According to embodiments, each of the stabilising rods or spacers may be non-electrically conducting. In this manner, an applied electric current may not be short-circuited via any of the rods or spacers but will only flow through the heating elements. For instance, the rods or spacers may be made from an electrically non-conductive ceramic material. Thus, the rods or spacers may withstand high temperatures within the electric heater.

According to embodiments, the heating elements of the plurality of heating elements may be electrically connected in series. In this manner, a suitable total resistance of the heating block may be achieved for an applicable voltage. Moreover, such an applicable voltage may be one of common line voltages, such as 230, 400, 480 or 690 V. This simplifies connection of the electric heater to an electrical grid. In particular, this may be achieved for the materials selected from the group of an iron-chromium-aluminium alloy; a nickel-chromium alloy, a copper-nickel based alloy or iron-nickel-chromium alloy, and an intermetallic material.

Optionally, the heater may comprise a single heating element defining the heating block having a plurality of bores or channels. In such a configuration, the internal facing surfaces that define the bores or channels provides predominantly the active heating surfaces of the fluid (gas). According to certain implementations, the active heating surface is the sum of the surface areas of the internal facing surfaces of the bores or channels.

The present heating block is formed from the high electrical resistance material and is the predominant or exclusive body through which current flows by the application of a voltage to the terminals of the heating block. This heating block or structure fulfils to main purposes: Creating and transferring heat and guidance of the fluid (gas) flow.

Optionally, the heater may comprise fins or projections projecting radially into the bores or channels. Such fins or projections are advantageous to increase the active surface area to heat the gas/fluids at the region between the first and second lengthwise ends of the heating block.

Optionally, the heating block may comprise perturbations projecting radially into the bores or channels to disrupt a flow of a fluid through the bores or channels. Such perturbations may be formed by nodes, projections, flanges, ribs, ridges, cross bars or beams, a mesh or the like, positioned in the bores or channels and restricting the fluid flow from an otherwise longitudinal flow path. Such perturbations may increase both the heating element surface area and the fluid mixing properties in the boundary layer and therefore increase the heat transfer rates accordingly.

Optionally, the bores or channels are defined by walls of the heating block, the walls comprising any one or a combination or bores, notches, grooves or detents that reduce a volume of the material at the walls. This provides a configuration to increase the HTVR, the surface load and heating density of the present heater.

Optionally, in a plane perpendicular to a longitudinal axis of the heating block, a cross-sectional area of the walls is non-uniform between the first and second ends and/or decreases between the first and second ends. Such a configuration may be advantageous to provide a differential or heating gradient longitudinally at the heating block. In particular, the heating block may be provided with tube walls being relatively thinner towards a first cooler end of the heating block to maximise/optimise the HTVR and surface load (given the relatively cool inlet flow of gas to this region of the heating block) relative to a relatively thicker downstream end where the gas/fluid is heated and exhausted from the device. Accordingly, the HTVR, surface load and heating density may be variable in the longitudinal direction between the first and second ends of the heating block.

According to one embodiment, the at least one heating element is axially elongate. In such a configuration a length of the heating element in a direction of fluid flow is greater than a width aligned perpendicular to the fluid flow.

According to the present disclosure, the heating device and in particular the internal heating assembly is devoid of any heating element based on coiled wire or a wire extending longitudinally within the bores or channels of the heating blocks. In particular, the flow of current provided to the heating effect is supplied exclusively through the walls of the heating block formed from the high electrical resistance material.

According to one embodiment, the heater further comprises a casing positioned to at least partially surround the heating block; and at least one mounting extending radially from the casing to contact and positionally secure the heating block within the heater. According to another embodiment, the heater may further comprise an insulation material positioned radially intermediate the casing and the heating block.

Optionally, the first and second terminals are positioned at or towards at least one of the first and second ends of the at least one heating element. According to one embodiment, the terminals are formed integrally with the at least one heating element and/or heating block. Optionally, the terminals are formed non-integrally with the at least one heating element and/or heating block and are chemically or mechanically attached to the heating assembly.

According to a further aspect of the present disclosure there is provided a modular electric heater assembly comprising a plurality of heating blocks as described and claimed herein connected electrically in series and/or in parallel.

BRIEF DESCRIPTION OF DRAWINGS

A specific implementation of the present disclosure will now be described, by way of example only, and with reference to the accompanying drawings in which.

DETAILED DESCRIPTION OF PREFERRED EMBODIMENT OF THE DISCLOSURE

Figure 1:
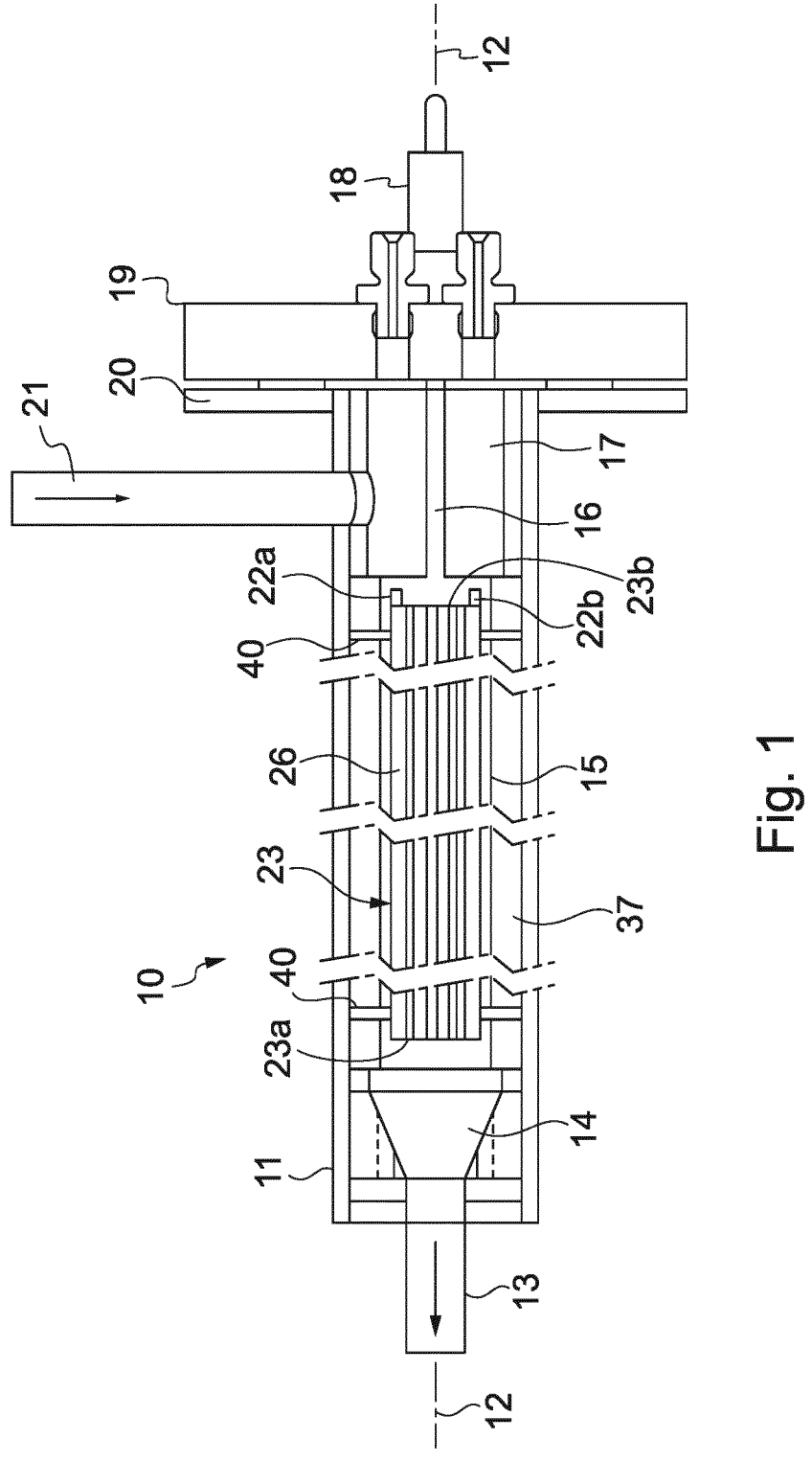
FIG. 1 is a cross-sectional side view of an electric heater incorporating a heating element according to a specific implementation of the present disclosure.
Figure 2:
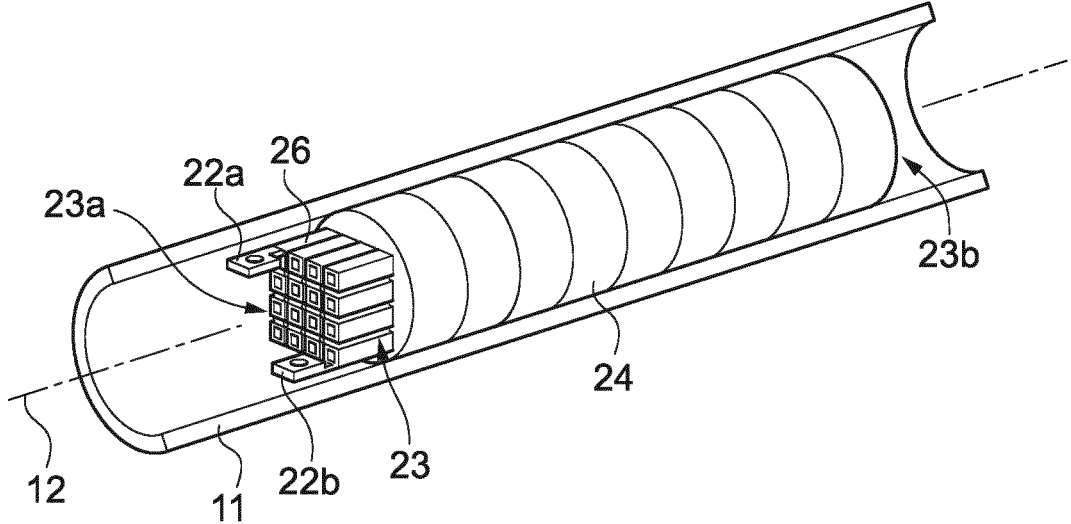
FIG. 2 is a perspective view of a heating assembly forming part of an electric heater of FIG. 1.

Referring to FIG. 1, an electric heater 10 comprises a casing in the form of a tubular sheath or housing 11 that defines an internal chamber 17. Heater 10 comprises a gas/fluid inlet tube 21 and a gas outlet nozzle 14 with exhaust tube 13. A fixing flange 20 is mounted to a current feed flange 19 that is in turn coupled to external electrical connections 18. An insulation material 37 is mounted internally within chamber 17 against or towards an internal facing surface of housing 11. The layer of insulation 37, in turn, defines an internal cavity 15, within chamber 17, to receive a heating block indicated generally by reference 23. Heating block 23 is mounted within a pair of hollow discs 40 that extend radially to between an outer surface of the heating block 23 and an internal surface of the housing 11.

Heating block 23 is formed from a plurality of elongate heating elements 26 assembled together to form a unitary heating assembly. The collection of generally linear heating elements 26 define a generally elongate heating block 23 having a first lengthwise end 23*a* and a second lengthwise end 23*b*. Heating block 23 further comprises first and second terminals 22*a*, 22*b* provided at/connected to second end 23*b* for connection to the external electrical connections 18 (via a conduit 16) for the supply of current to the heating elements 26 and accordingly heating block 23.

Referring to FIGS. 1, 2, 3*a* and 3*b* each heating element 26 is formed as an internally hollow elongate tube in which an internal bore or channel 25 is defined by an internal facing surface 28 of a wall 32 that represents the main body of each heating element 26. The internal bore or channel 25 forms the only bore or channel 25 through each heating element 26. Wall 32 further comprises an external facing surface 29 and is defined between the respective internal and external facing surfaces 28, 29. Each heating element 26 and accordingly heating block 23 is elongate with heating block 23 centred on longitudinal axis 12 and each respective heating element 26 centred on its own respective longitudinal axis 31.

Heating element 26 is formed preferably from a high electrical resistance material such as iron-chromium-aluminium (FeCrAl). Examples of materials are those the alloys sold under the tradename Kanthal® APM or Kanthal® APMT or if additive manufacturing us used as a manufacturing method a powder sold under the tradename Kanthal® PM100, all available from the company Kanthal, Sweden, the chemical composition and the physical and mechanical properties of which is incorporated herein by reference. Depending on the composition of the fluid other resistance materials such as nickel-based alloys or molybdenum-based alloys might be preferable.

With the heating elements 26 connected to the external electrical connections 18 via terminals 22*a*, 22*b*, a voltage/current may be applied to block 23. Accordingly, a gas/fluid may be heated as it flows from tube 21 into chamber 17 and through block 23. In particular, the gas is adapted to flow through the internal bores 25 to be exhausted from device 10 via nozzle 14 and exhaust tube 13. According to the specific implementation, block 23 (via walls 32 of each heating element 26) is heated directly by the applied current so as to provide direct active heating (of the gas flow) within bores 25 and the gap regions 38. Accordingly, the present heating assembly obviate the need for an internally mounted heating wire or conduit extending within bores 25 (as is common to conventional fluid electric heaters). The present arrangement is advantageous to maximise efficiency and effectiveness of thermal energy transfer between the heating elements 26 and the fluid flowing within internal chamber 17. In particular, the present arrangement provides a large heating-surface area to volume ratio (HTVR) that may be defined as the heating material active surface area (wetted surface area) divided by the enveloping volume of the heating element 32.

Within the block 23, the heating elements 26 may be connected in series. That is, the voltage applied to the block 23 via terminals 22*a*, 22*b* causes an electric current to flow in series through the heating elements 26. For this purpose, the heating elements 26 are connected one after the other via conducting elements, not shown in FIGS. 1-3*c*. Reference is made to the embodiments of FIG. 4 and the discussion of the conducting elements 41.

According to the specific implementation, insulation material 24 may be positioned to encapsulate or at least partially surround the external facing surface of heating block 23 (as defined by regions of the external facing surface 29 of each heating element 26). In such an arrangement, these covered regions of the external facing surface 29 are inactive to heat the fluid flow such that internal facing surface 28 may be the predominant, active heating surface. However, other non-concealed/obstructed regions of external facing surface 29 may be considered active as the gas flows between neighbouring heating elements 26.

Figure 3A:
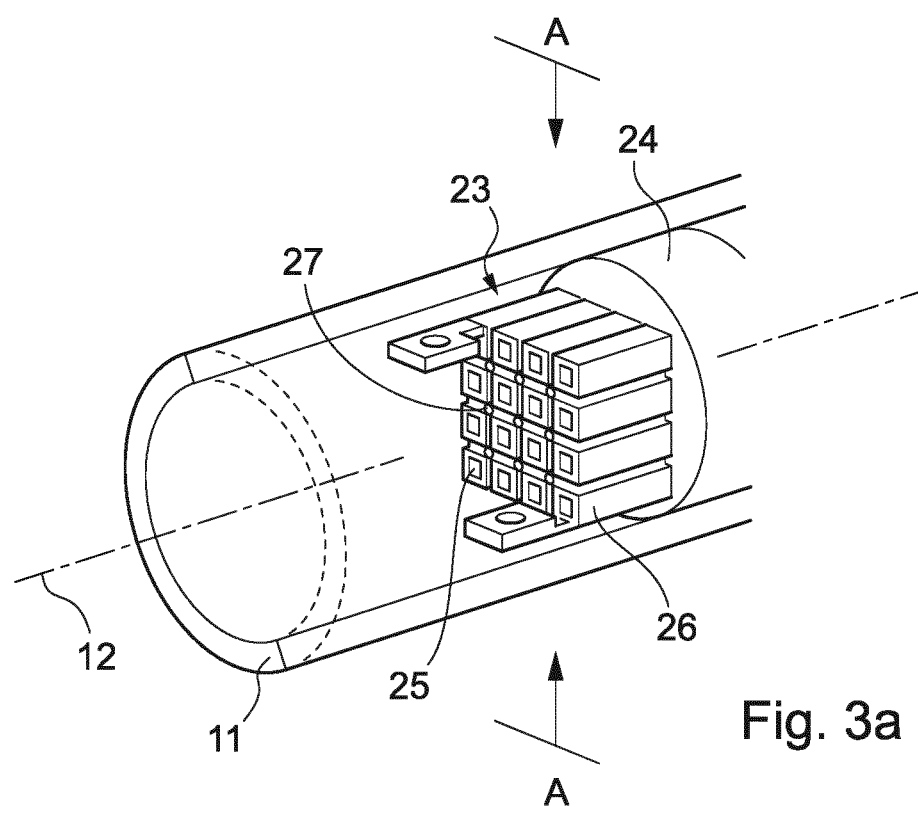
FIG. 3a is a magnified view of one end of the heating assembly/heating block of FIG. 2.
Figure 3B:
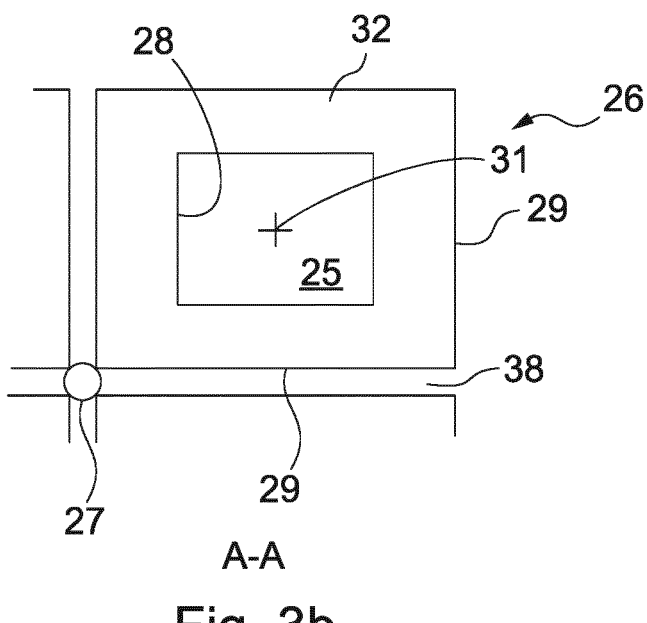
FIG. 3b is a cross-sectional view through A—A of the heating elements that form the heating block of FIG. 2.

In particular and referring to FIGS. 3*a* and 3*b*, the heating elements 26 are positionally stabilised and held as a unitary assembly via intermediate elongate rods 27 extending between and abutting edges/surface regions of neighbouring heating elements 26. The rods 27 are dimensioned so as to create the gap regions 38 that are effective to increase the HTVR via the available active heating surfaces being defined by both internal and external surfaces 28, 29. Rods 27 may extend over the full axial length of heating element 26 or may extend over only part of the full length. Accordingly, rods 27 may be formed as relatively short bushings or spacers so as to further maximise the available active heating surface area that, in turn, enhances the HTVR.

Accordingly, the HTVR of the heating block 23 may be defined as the sum of the active/exposed heating surfaces (including both the internal facing surface 28 and regions of the external facing surface 29) divided by the total enveloping volume of the heating block forming/creating the walls 32. As such, the present heating assembly (heating block 23) comprises a high heating surface area per volume, i.e. a high heating density. Such an arrangement accordingly provides a heating arrangement with a relatively low surface load expressed in W/m². Advantageously, the present hearting arrangement/device is adapted for relatively longer operational lifetimes in addition to higher outlet temperatures at exhaust regions 13, 14. With heating element 26 formed from the high electrical resistance material sold under the tradename Kanthal® APM or Kanthal® APMT or if additive manufacturing is used as a manufacturing method a powder sold under the tradename Kanthal® PM100 may be used, all available from the company Kanthal, Sweden, maximum heating temperatures in air of around 1300° C. are possible. Heating element surface loads may be in the range 1 to 3 $W/cm^2$ for atmospheric conditions and can reach numbers up to 30 $W/cm^2$ for systems operated at 100 bar pressure. An electric heater according to the present disclosure may comprise a HTVR (1/m) of 1 to 2.5 via the configuration as described herein. This is to be contrasted with conventional process electric heaters in which a thin high electrical resistance heating wire is mounted and threaded through internal bores of a ceramic heating block. Such conventional arrangements typically achieve a maximum heating temperature in air of 1100° C. with an element surface load of 3 to 20 $W/cm^2$ and a HTVR of 0.2 to 0.5.

Figure 4:
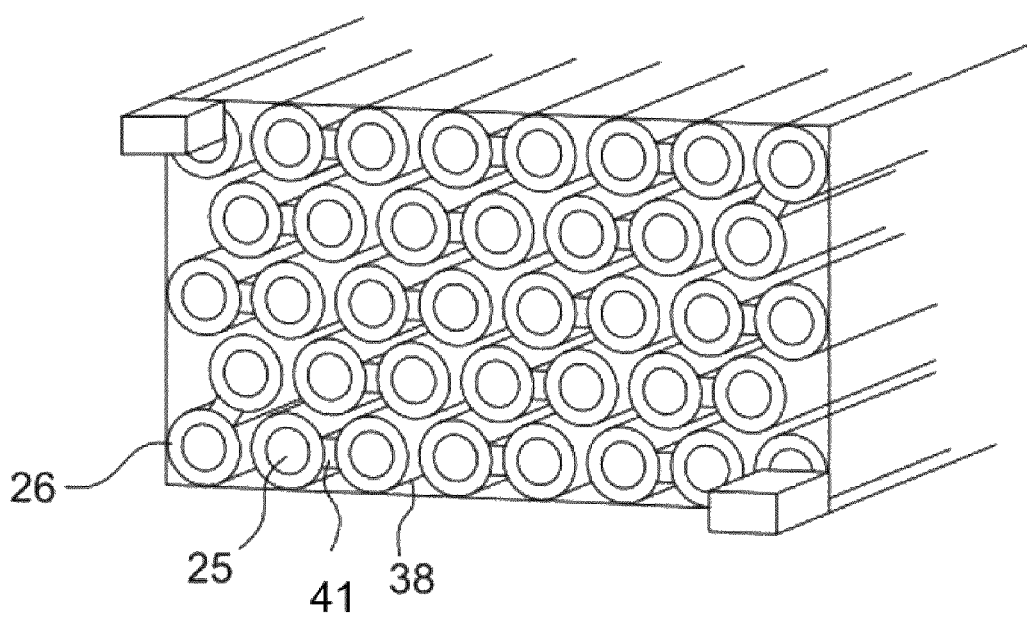
FIG. 4 is an end perspective view of a heating block according to a further specific implementation of the present disclosure.

FIG. 4 illustrates a further implementation of the heating block 23 of FIGS. 1 to 3*b* in which the individual heating elements 26 are formed as tubes having a circular cross-sectional shape profile relative to the rectangular cross-sectional profile illustrated in FIG. 3*b*. As will be noted, the cross-sectional profile though A—A is defined in a plane aligned perpendicular to longitudinal axes 12, 31.

Again, the heating elements 26 are electrically connected in series. For this purpose, there are provided a suitable number of conducting elements 41, each of which connects two heating elements 26, such that the heating elements 26 are connected in series throughout the heating block.

Accordingly, one such conducting elements 41 may connect one end portion of a first heating element 26 with an end portion of a second heating element 26. An opposite end portion of the second heating element 26 is connected to an end portion of a third heating element 26 and so one throughout the heating block 23. The first and last heating element 26 of this chain of interconnected heating elements 26 is provided with one each of the terminals 22*a*, 22*b*.

The conducting elements 41 may be manufactured together with the heating elements 26 during manufacturing of the heating block 23 in an additive manufacturing process. In this manner, the entire heating block 23 may be manufactured in one manufacturing step. If stabilising rods 27 are utilised, they may be inserted after manufacturing of the heating block 23. Optionally, also the terminals 22*a*, 22*b*, see also FIG. 2, may be manufactured in the additive manufacturing process.

Alternatively, the conducting elements 41 may be manufactured separately from the heating elements 26 and may be joined to the heating elements 26 in a separate manufacturing step.

Also, in this implementation of the heating block, the heating elements 26 may be positionally stabilised and held as a unitary assembly via intermediate elongate rods (not shown) extending between and abutting edges/surface regions of neighbouring heating elements 26. In this implementation, each of the rods would abut against three neighbouring heating elements 26. Again, gap regions would be maintained/formed between the individual heating elements.

Figure 5:
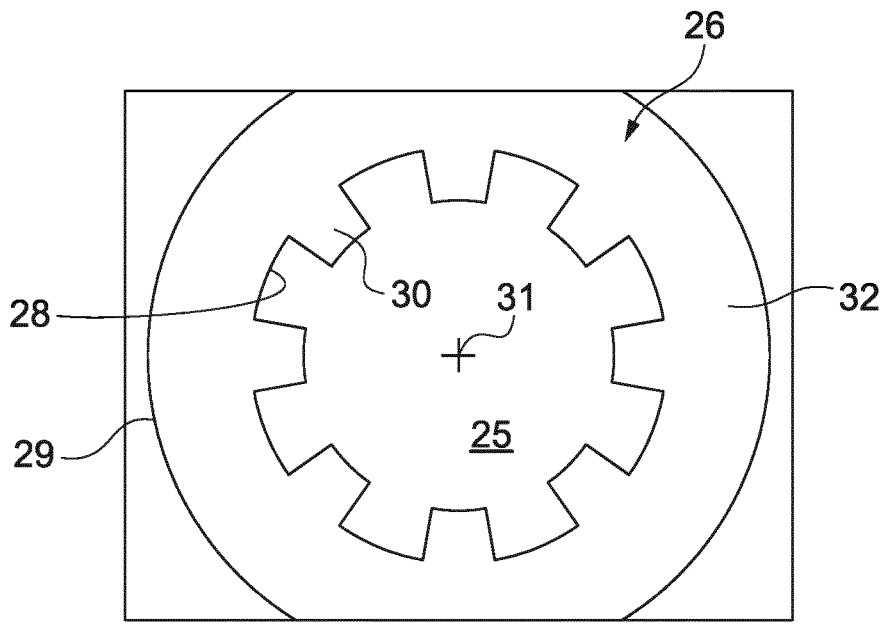
FIG. 5 is a cross-sectional view of a heating element having inwardly projecting fins according to a further implementation of the present disclosure.

FIG. 5 illustrates a further implementation of the present disclosure in which each heating element 26 comprises radially inward projecting fins 30. Each fin 30 extends from wall 32 towards the axial centre 31 of the internal bore 25. Fins 30 are advantageous to further increase the active surface area and in turn the HTVR, heating density and accordingly available output operating temperatures of the heated gas from exhaust 13, 14 or smaller heater feature size at constant fluid outlet temperatures.

Figure 6:
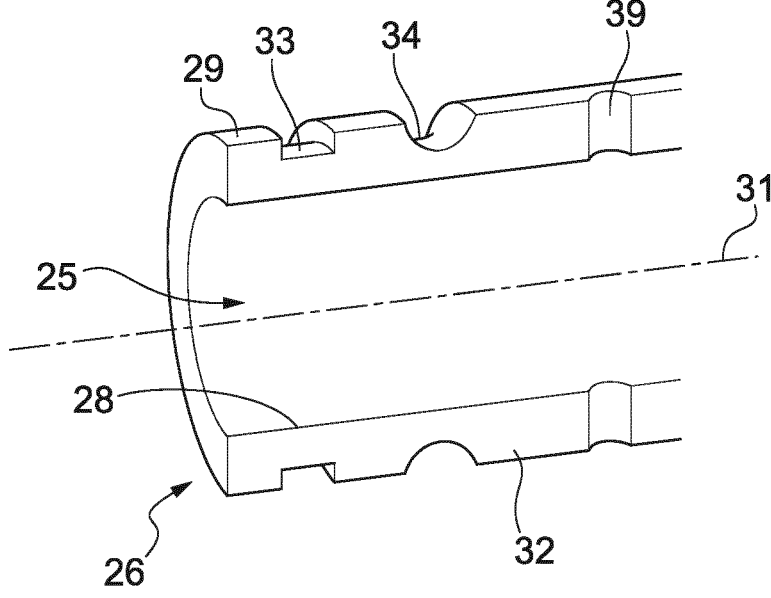
FIG. 6 is a partial cross-sectional perspective view of a heating element according to a further specific implementation having sections with reduced wall thickness according to specific implementations.

Referring to FIG. 6, the HTVR may be enhanced further by reductions in the volume of high resistance material forming the walls 32. In particular, regions of the walls 32 may be reduced in thickness via grooves 33 or channels 34 recessed in external surface 29 of each or at least some of the heating elements 26. In addition or alternatively, the walls 32 may comprise through-bores 39 extending between external and internal facing surfaces 29, 28 to further reduce the mass of the electrically conducting material and accordingly increase the HTVR. The features mentioned above may also allow for an artificial increase of the overall resistance of the whole flow heater, which will make the present flow heaters 10 even more appropriate for a direct connection to the line voltage.

Figure 7:
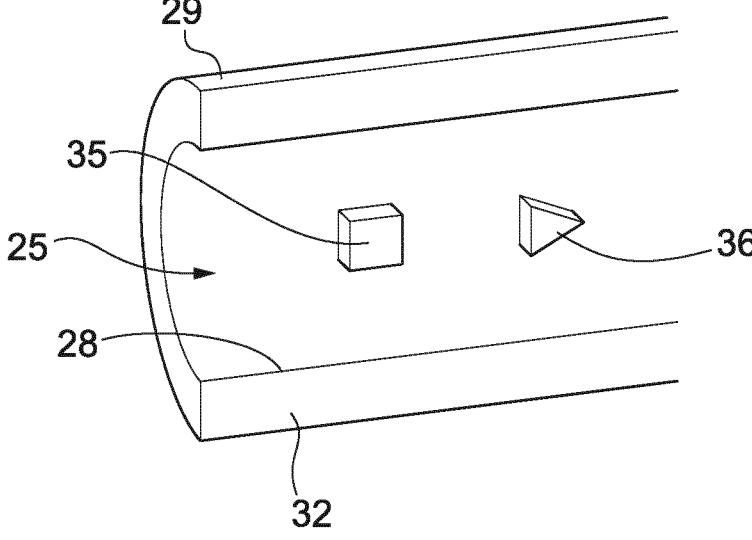
FIG. 7 is a part cross-sectional perspective view of a heating element incorporating internal perturbations to disrupt fluid flow through the heating element according to further specific implementations.

Referring to FIG. 7, according to further optional implementations, at least some of the heating elements 26 may be provided with perturbations 35, 36 in the form of obstructions that project radially inward from the wall internal facing surface 28. Such perturbations 35, 36 are positioned in the flow path of bore 25 and are effective to disrupt the flow of gas and in turn create Eddy currents thereby enhance mixing effects in a boundary layer and thus increasing the heat transfer to the fluid. Such perturbations may further increase the active heating surface area for the reasons mentioned above.

Figure 8:
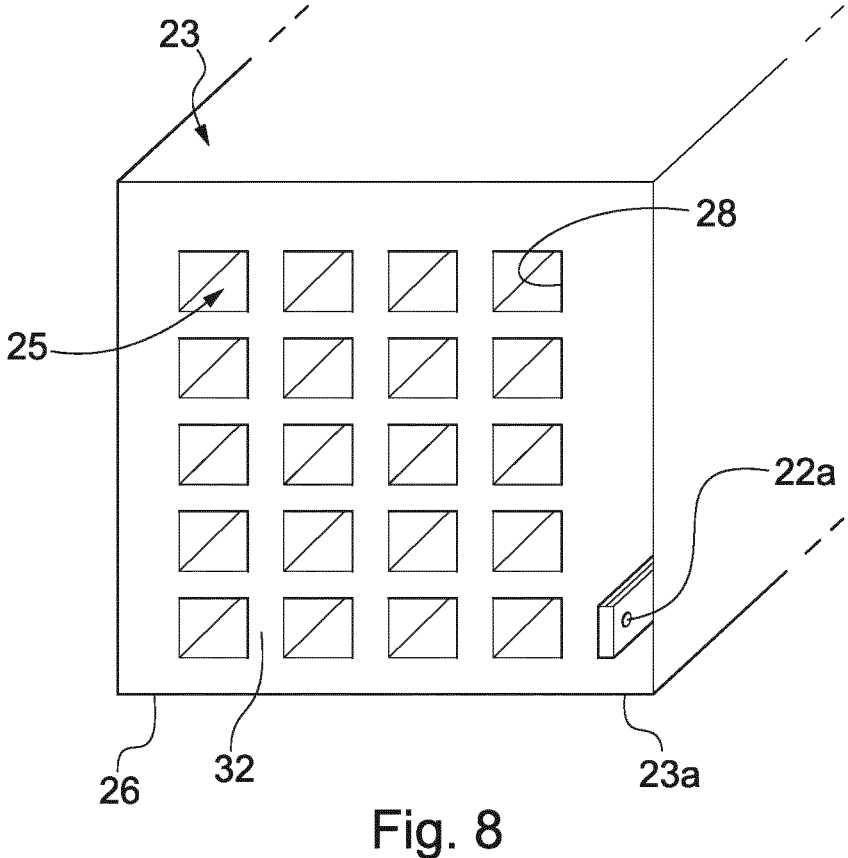
FIG. 8 is a perspective view of a further implementation of the present disclosure in which a heating block is formed as a unitary body via a single heating element.

Referring to FIG. 8, a further implementation of heating block 23 is formed as a single unitary body in which a single heating element 26 comprises a plurality of internal bores extending between first and second lengthwise ends 23*a* and 23*b* (shown referring to FIG. 1). Electrical terminals 22*a* and 22*b* (shown referring to FIG. 1) are connected to or provided at, or towards, one or both lengthwise ends 23*a*, 23*b* so as to make electrical connection with an external current supply. Heating block 23 of the further implementation is also formed from the high electrical resistance material such as a FeCrAl alloy. All other features and function of the heating block 23 of FIG. 8 is as described for the embodiments of FIGS. 1 to 7 in which a gas is adapted to flow within bores 25 and is heated by the passage of current through the resistance material that forms the heating block walls 32.

The heating block 23/heating element(s) 26 may be manufactured conveniently via conventional techniques such as 3D printing and other computer-model based engineering manufacturing methods. Such techniques enable the manufacture of intricate shapes and configurations of heating element as illustrated in FIGS. 5 to 8 including fins 30, grooves and channels 33, 34, bores 39 and perturbations 35, 36 during a single manufacturing process.

The present embodiments are described with reference to the high electrical resistance material as an FeCrAl based alloy. However, the embodiments may be formed from any suitable material that is electrically conducting including NiCr based alloys, NiCrFe based alloys, CuNi based alloys or Mo-based alloys. All configurations may be formed from powder-based materials and processes.

Electrical terminals 22*a*, 22*b* may be formed integrally with heating elements 26 and/or heating block 23. According to further implementations, terminals 22*a*, 22*b* may be attached or connected to respective regions of the heating block 23 via chemical or mechanical attachment. Preferably, terminals 22*a*, 22*b* are formed integrally and at one lengthwise end of heating block 23.

The invention claimed is:

1. An electric heater to heat a flow of a fluid, comprising:
   at least one heating element defining an axially elongate heating block having first and second lengthwise ends;

a plurality of longitudinal bores or channels extending internally through the axially elongate heating block and being open at each respective first and second lengthwise end;

the at least one heating element consisting of an electrically conducting material for active resistance heating or more than one electrically conducting material for active resistance heating; and first and second terminals provided at the heating block for connection to a current supply, wherein the electrically conducting material or the more than one electrically conducting material is/are selected from the group of an iron-chromium-aluminium alloy;

a nickel-chromium alloy, a copper-nickel based alloy or iron-nickel-chromium alloy, and an intermetallic material, wherein a plurality of heating elements are assembled together as the heating block, each heating element comprising the material and having a bore or channels that in part defines the bores or channels of the heating block, and wherein the plurality of longitudinal bores or channels extending internally through the axially elongated heating block include channels formed in gap regions between external facing surfaces between neighbouring heating elements.

2. The electric heater as claimed in claim 1, wherein the heating element is manufactured by using additive manufacturing, in which the electrically conducting heating block is formed as unitary body or as an assembly/collection of additive manufacturing printed individual heating elements electrically coupled and mechanically assembled to form the heating block.

3. The electric heater as claimed in claim 1, wherein a heating element surface load is in the range of 1 to 3 W/cm² under atmospheric conditions and outlet temperature is within a range of 1 000 to 1 250° C.

4. The electric heater as claimed in claim 1, comprising a plurality of stabilising rods or spacers positioned between and abutting against the heating elements along their respective lengths, the heating elements being spaced apart from one another and in indirect contact via the rods or spacers.

5. The electric heater as claimed in claim 4, wherein each of the stabilising rods or spacers is dimensioned so as to create the gap regions between the heating elements.

6. The electric heater as claimed in claim 4, wherein at least one of the stabilising rods or spacers is arranged in abutment with three or four of the heating elements.

7. The electric heater as claimed in claim 4, wherein each of the stabilising rods or spacers is non-electrically conducting.

8. The electric heater as claimed in claim 1, wherein the heating elements of the plurality of heating elements are electrically connected in series.

9. The electric heater as claimed in claim 1, comprising a single heating element defining the heating block having the plurality of bores or channels.

10. The electric heater as claimed in claim 1, wherein the heating block comprises fins or projections projecting radially into the bores or channels.

11. The electric heater as claimed in claim 1, wherein the bores or channels are defined by walls of the heating block, the walls comprising any one or a combination or bores, notches, grooves or detents that reduce a volume of the material at the walls.

12. The electric heater as claimed in claim 1, comprising:

a casing positioned to at least partially surround the heating block; and at least one mounting extending radially from the casing to contact and positionally secure the heating block within the heater; and optionally further comprising an insulation material positioned intermediately casing and the heating block.

* * * * *